United States Patent [19]

Smith

[11] Patent Number: 4,943,269
[45] Date of Patent: Jul. 24, 1990

[54] DIFFERENTIAL WITH LOCK-OUT MECHANISM

[76] Inventor: Roger R. Smith, 7261 Lyons Rd., Imlay City, Mich. 48444

[21] Appl. No.: 358,735

[22] Filed: May 26, 1989

[51] Int. Cl.⁵ .............. F16H 1/38; F16H 1/44; F16H 1/445
[52] U.S. Cl. ................... 475/231; 475/233; 475/237; 475/150
[58] Field of Search ............ 74/710, 710.5, 713, 74/711; 192/84 B, 84 R, 93 A; 188/72.1, 163, 161; 475/231, 233, 237, 150

[56] References Cited
U.S. PATENT DOCUMENTS

| | | | |
|---|---|---|---|
| 1,222,902 | 4/1917 | Storm | 74/710.5 |
| 1,447,116 | 2/1923 | Baird et al. | 74/710.5 |
| 2,132,692 | 10/1938 | Lawrence | 74/710.5 |
| 2,175,684 | 10/1939 | Dickerson | 74/710.5 |
| 2,949,991 | 8/1960 | Jaeschke | 192/84 R |

Primary Examiner—Leslie A. Braun
Assistant Examiner—Khoi Q. Ta
Attorney, Agent, or Firm—Peter A. Taucher; David L. Kuhn

[57] ABSTRACT

Disclosed is a differential mounted between two drive wheels of a vehicle, the differential having a lock-out mechanism for disabling the differential and forcing the drive wheels to rotate at the same speed.

6 Claims, 4 Drawing Sheets

DIFFERENTIAL WITH LOCK-OUT MECHANISM

GOVERNMENT INTEREST

The invention described herein may be manufactured, used, and licensed by or for the Government for governmental purposes without payment to me of any royalty thereon.

BACKGROUND AND SUMMARY

The invention relates to differential mechanisms for drive trains of vehicles and more particularly relates to a lock-out mechanism for selectively disabling the differential mechanism.

Vehicle differentials conventionally have various devices to inhibit slippage between a pair of powered wheels of a vehicle, so that the vehicle can more easily travel over poor tractive surfaces such as snow. In general these devices add weight, bulk, complexity and cost to the drive train of a vehicle. For some vehicles, such as military trucks, which may be overhauled numerous time during 10 to 20 years of hard use, a more complex differential adds to the overall cost of owning and operating the vehicle during its life. Also, of course, added bulk and weight in a vehicle differential reduce the payload capacity of the vehicle.

My invention is a vehicle differential incorporating a simple, compact mechanism for selectively locking out or disabling the differential of a vehicle. The lock-out mechanism is operable by mechanical or electrical actuation by the driver of the vehicle. Essentially, my device functions by braking or debraking a particular gear of the differential which rotates when vehicle axle shafts turn at different rates.

DETAILED DESCRIPTION

Figure 1:
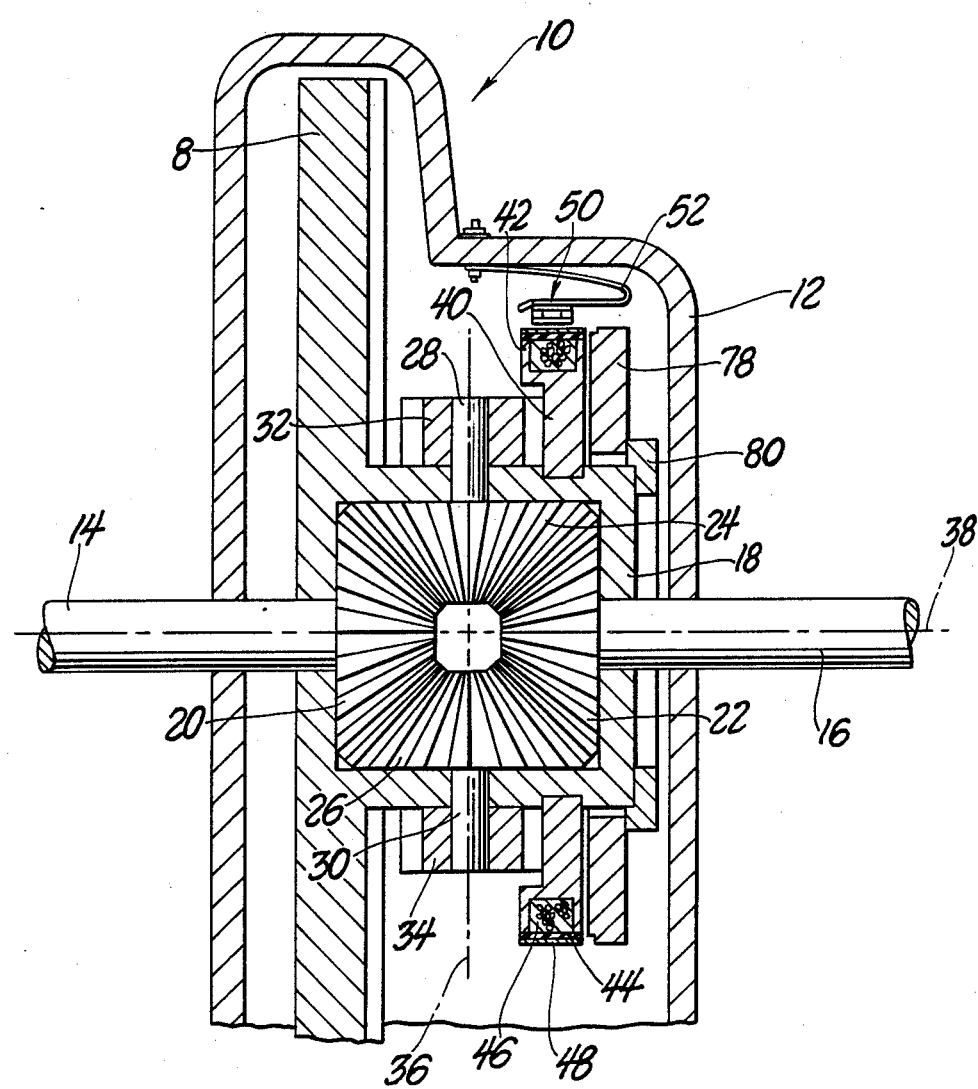
FIG. 1 is a sectional view of my differential and its lock-out device.

In FIG. 1 is shown an automotive vehicle differential 10 having a housing 12 and two axle shafts 14 and 16 extending therefrom. Within housing 12 is a generally cylindrical gear case 18 coaxial with shafts 14 and 16, the shafts being journalled in the end walls of the gear case. On the exterior of gear case 18 is transfer gear 8 receiving rotary mechanical power from a drive shaft (not shown). Inside case 18 and coaxial therewith are bevelled differential side gears 20 and 22, which are fixed to the ends of shafts 14 and 16 respectively. Disposed between the differential side gears are orbital gears 24 and 26 respectively, each orbital gear meshing with both side differential gears. Journalled to case 18 are pinion shafts 28 and 30. Pinion gears 32 and 34 are fixed to the pinion-shafts on the exterior of case 18, whereby pinion gear 32 is rotated by orbital gear 24 and pinion gear 34 is rotated by orbital gear 26 about pinion axis 36. In known fashion, a difference in angular speed of axle shafts 14 and 16 on common axis 38 will cause orbital gears 24 and 26 to rotate with respect to pinion axis 36. Consequently, pinion gears 32 and 34 will also rotate about axis 36 when there is a speed differential between shafts 14 and 16.

Rotatable upon, but axially fixed to gear case 18 is an annular gear 40 on whose one axial side are teeth meshing with pinion gears 32 and 34. Although not so shown in FIG. 1, it may be preferable that gears 32, 34 and 40 are bevelled for smoother engagement of gear 40 with gears 32 and 34. The radially outer zone 42 (FIG. 2) of annular gear 40 contains an electromagnetic coil 46, a layer of electrically insulative material 44 surrounding the coil, and an electrically conductive strip 48 surrounding insulative material 44. Electromagnetic coil 46 has a first electrical terminal (not shown) connected to conductive strip 48 and a second electrical terminal (not shown) connected to the radially inner portion of annular gear 40, which is grounded, so that coil 46 is energized by current entering the first terminal and leaving the second terminal. One possible ground path from the second terminal is through the radially inner portion of gear 40, through case 18, through shafts 14 or 16, through housing 12, and thence to the vehicle frame.

Rotatably fixed but axially slidable on case 12 is a clutch plate 78, there being an abutment ring 80 fastened at one end of case 18 to limit the distance clutch plate 70 can travel away from annular gear 40. When coil 46 is energized, clutch plate 78 translates into frictional engagement with annular gear 40 and thereby retards or stops the rotation of annular gear 40 relative to gear case 18.

Figure 2:
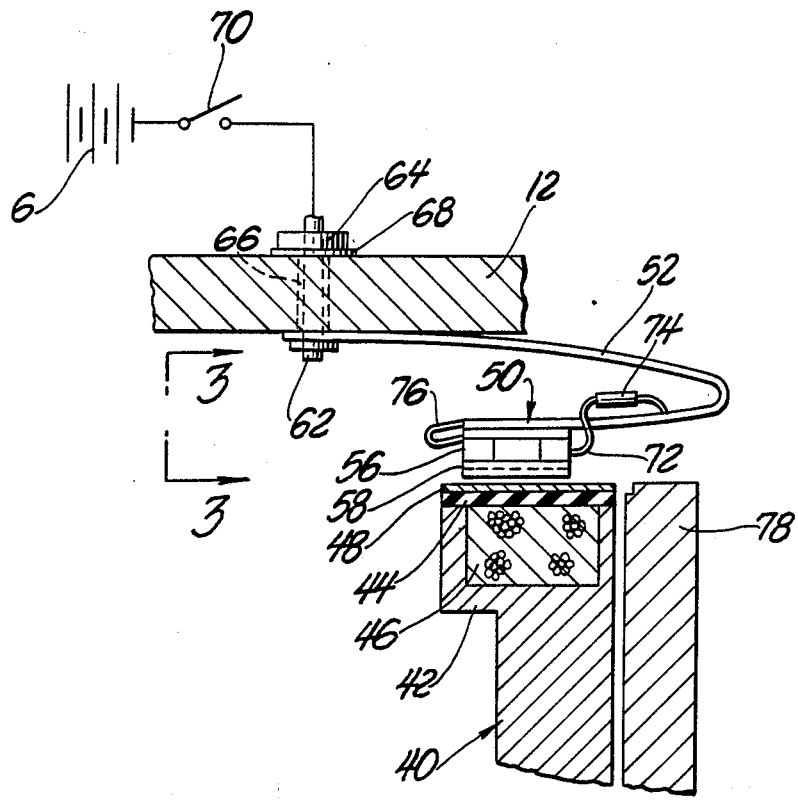
FIG. 2 is a detail view of my differential showing a switch in the differential housing and showing a main electromagnetic coil actuated by the switch.
Figure 3:
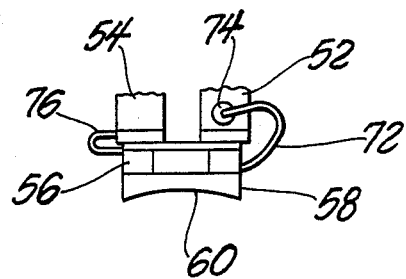
FIG. 3 is a view taken along line 3—3 in FIG. 2.

The radially outer zone 42 of gear 40 is also shown in FIG. 2 along with a detail view of switch 50, which is disposed radially outward of annular gear 40 on an inner peripheral wall surface of housing 12. Switch 50 has a pair of substantially identical spring arms 52 and 54. Only spring arm 52 is visible in FIG. 2 but both spring arms are partially shown in FIG. 3. Fixed to the ends of the respective spring arms is switch coil 56 and a small contact plate 58 having a curved surface 60. The curved surface is congruently faceable against electrically conductive strip 48 on the outer diameter of annular gear 40. It is intended that energizing coil 56 will cause movement of contact plate 58 into bearing, sliding engagement with conductive strip 48, whereby coil 46 receives electrical power.

Spring arm 54 is insulated from contact plate 58 and from spring arm 52, so that current in arm 52 is not shunted through arm 54 to housing 12. Spring arm 52 is attached to housing 12 by a means such as bolt 62 and nut 64 threaded thereto, spring arm 52 being electrically insulated from housing 12 by a suitable coating on the arm, a sleeve 66 around bolt 62 and a grommet 68 between nut 64 and housing 12. A switch 70, which may be in the driver's compartment of the vehicle, is connected in series between arm 52 and an electrical power source in the vehicle.

Switch coil 56 receives current through line 72, which has resistor 74 therein and which is connected between coil 56 and spring arm 52. Resistor 74 may be fixed directly to arm 52 to secure it against dislodgement by the flow of differential fluid in housing 12. Current leaves coil 56 via line 76 and enters spring arm 54, which is grounded to housing 12.

In operation, when it is desired to lock out the differential of the vehicle, switch 70 is closed, whereupon switch coil 56 is energized. Contact plate 58 engages electrically conductive strip 48 to complete an electrical path from an electrical power source 6 through switch coil 46 and thence to ground. Clutch plate 78 is then attracted into frictional contact with annular gear 40, whereupon annular gear 40 stops rotating relative to gear case 18 so that axle shafts 14 and 16 must then rotate together. When switch 70 is thereafter opened, coils 46 and 56 are de-energized and clutch plate 78 disengages from annular gear 40. Spring arms 52 and 54 disconnect contact plate 58 from conductive strip 48, thereby saving wear on plate 58 and strip 48. Clutch plate 78 may be provided with a means to bias it axially away from annular gear 40 so that clutch plate 78 positively disengages from annular gear 40 once coil 46 is de-energized.

Figure 4:
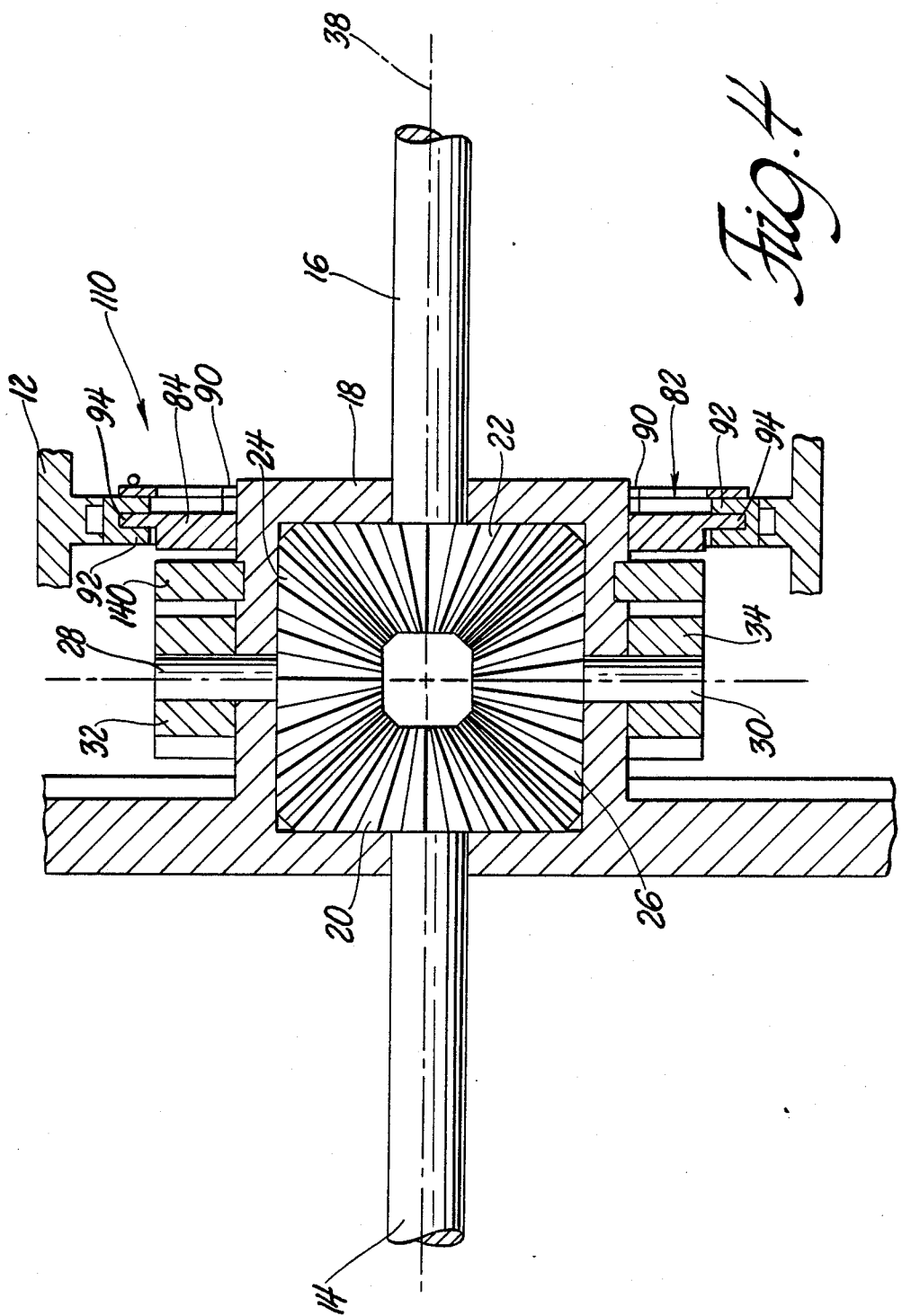
FIG. 4 is a sectional view of an alternate embodiment of my differential.
Figure 5:
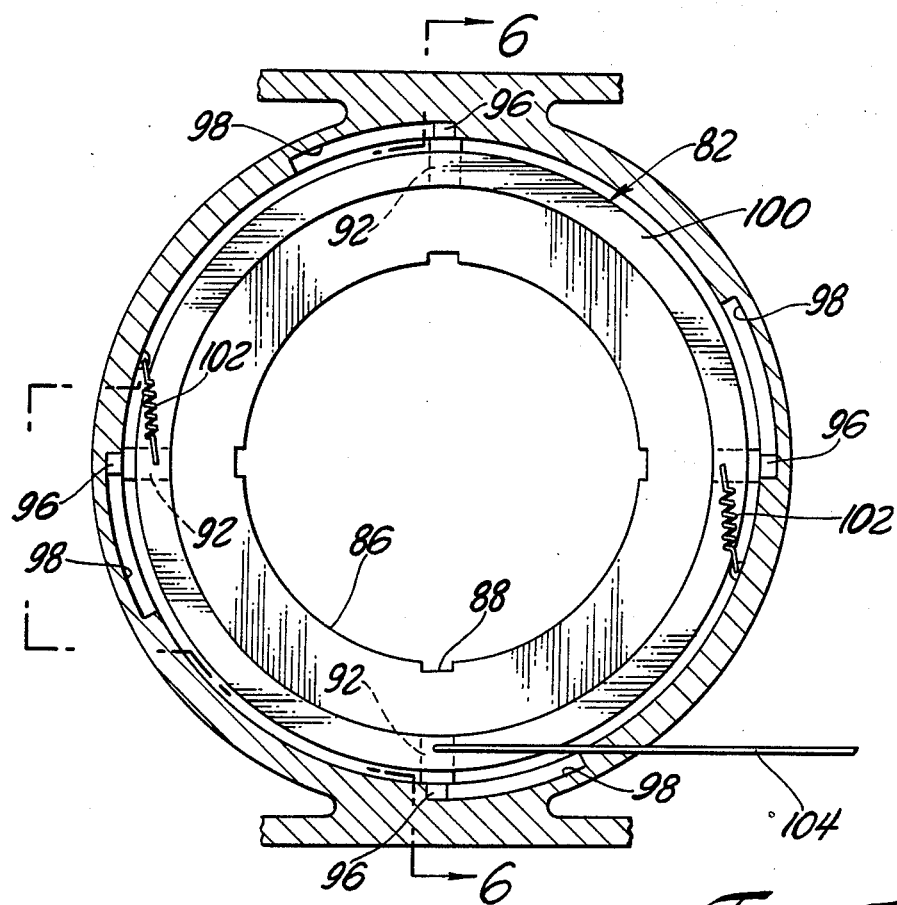
FIG. 5 is partial sectional view of the differential in FIG. 4 showing the clutch plate and associated structure.

A second embodiment of my invention is shown in FIG. 4 as differential 110. Differential 110 is essentially the same as differential 10 (FIG. 1) except that axially fixed annular gear 140 replaces annular gear 40 and a mechanically actuated clutch mechanism 82 replaces the electromagnetic clutch mechanism shown in FIGS. 1 and 2. Annular gear 140 is rotatable on gear case 18 about axis 38 and has one axial face opposed to an axial face of clutch plate 84. As best seen in FIG. 5, clutch plate 84 defines a central aperture 86 having keyways 88 at the edges thereof for accommodating ridges 90 on the exterior of gear case 18. Ridges 90 and keyways 88 permit clutch plate 84 to slide axially but not to rotate upon housing 18.

Spaced at equiangular intervals about the periphery of clutch plate 84 are cross-sectionally U-shaped brackets 92 which are open toward the radially inward direction. Brackets 92 slippingly retain radial flange 94 of clutch plate 84, there preferably being slight axial and radial play between brackets 92 and flange 94. The axial and radial play will reduce friction in differential 110 under normal operating conditions, i.e., when differential 110 is not being locked out. Brackets 92 are fixed to flat ring 100 and the brackets are provided with radially outwardly projecting bosses or studs 96 which slide in camming slots 98 in housing 12. Bosses 96 in slots 98 and clutch plate 94 act together to retain brackets 92 within the assemblies shown in FIGS. 5 and 6. Each bracket 92 has a first arm 92a extending radially inwardly along one side of the outer peripheral zone of clutch plate member 84 and has a second arm 92b extending radially inwardly along the opposite side of clutch plate member 84. The axial distance between the arms is slightly greater than the axial width of the outer peripheral zone of clutch plate member 84. A bridge portion 92c of bracket 92 connects the arms and is radially spaced from the outer peripheral zone of the clutch plate member. Brackets 92 are biased toward one end of slots 88 by one or more springs 102 connected between housing 18 and individual brackets 92. The assembly of ring 100 and brackets 92 has limited angular mobility relative to housing 12 about axis 38, the range of the angular mobility being determined by the length of slots 98.

Figure 6:
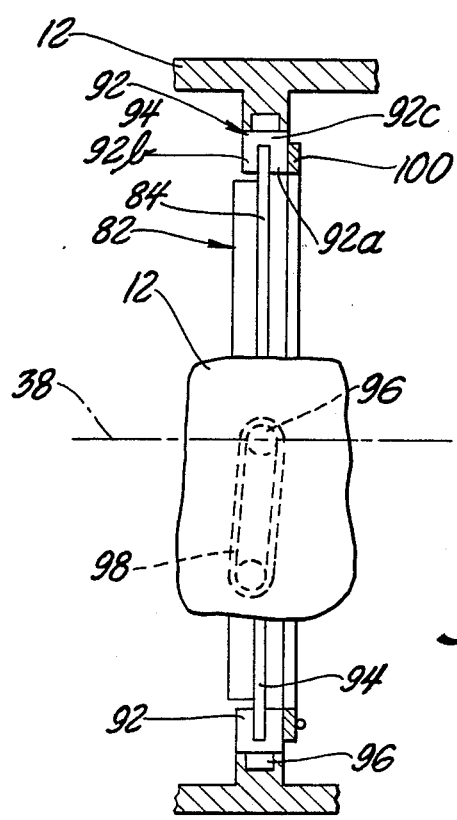
FIG. 6 is a view taken along line 6—6 in FIG. 5.

As best seen in FIG. 6, slots 98 are angled so that rotation of the bracket/ring assembly relative to housing 12 translates the assembly along axis 38, whereby clutch plate 84 is moved toward or away from annular gear 140. Rotation of the bracket/ring assembly counterclockwise in FIG. 5 is caused by pulling on cable 104 attached to one of brackets 92, whereby clutch plate 84 translates into engagement with annular gear 140. When the cable is released, the assembly is rotated by springs 102 in the clockwise direction until the assembly returns to its FIG. 5 position, whereby clutch plate 84 is disengaged from annular gear 140. In a manner similar to that described for the first embodiment, engagement of clutch plate 84 with annular gear 140 will cause axle shafts 14 and 16 to rotate at the same speed.

I wish it to be understood that I do not desire to be limited to the exact details of construction shown and described herein since obvious modifications will occur to those skilled in the relevant arts without departing from the spirit and scope of the following claims.

I claim:

1. A differential receiving rotary mechanical power from an input shaft and transmitting the rotary mechanical power to a pair of output shafts, the differential having a lock-out mechanism for compelling the output shafts to rotate at the same speed, the differential comprising:

a housing in which the input shaft and output shafts are journalled; the output shafts having a common axis;

a gear case rotatable in the housing on the common axis;

a transfer gear rotating the gear case in response to rotation of the input shaft;

an opposed gear coaxially fixed to each output shaft;

at least one orbital gear inside the case meshed with both of the opposed gears, whereby relative rotation between the opposed gears compels rotation of the orbital gear;

a pinion gear external to the gear case, the pinion gear rotating in concert with the orbital gear;

an annular gear member concentrically and rotatably mounted to the exterior of the gear case, the annular gear member having teeth on one axial side for meshing engagement with the pinion gear, whereby relative rotation between the opposed gears results in rotation of the annular gear member relative to the gear case;

a clutch mechanism surrounding the gear case at a position axially adjacent the annular gear member, the clutch mechanism having a clutch plate member rotationally fixed relative to the housing and axially translatable on the case along a path parallel to the common axis so that the clutch plate member can be frictionally engaged or disengaged from the annular gear member;

wherein the clutch mechanism further comprises a plurality of brackets disposed about an outer peripheral zone of the clutch plate member, each bracket having a first arm extending radially inwardly along one side of the outer peripheral zone of the clutch plate member and a second arm extending radially inwardly along an opposite side of the outer peripheral zone of the clutch plate member, the axial distance between the arms being slightly greater than the axial width of the outer peripheral zone of the clutch plate member, a bridge portion of the bracket connecting the arms, the housing having an inner peripheral wall defining arcuate slots, the bridge portion of the brackets each defining a boss projecting into one of the slots, the slots being oblique to a plane passing through the housing perpendicular to the common axis, the brackets sliding along the arcuate slots while travelling in a curved path about the outer peripheral zone of the clutch plate member so that sliding the brackets along the slots results in angular movement of the brackets about the common axis and simultaneously results in translation of the brackets and the clutch plate member along the path parallel to the common axis;

holder means for fixing the positions of the brackets relative to one another;

means for biasing the brackets to a first angular position such that the clutch plate member is disengaged from the annular gear member;

means for moving the brackets to a second angular position such that the clutch plate member engages the annular gear member.

2. The differential of claim 1, further including:

a main electromagnetic coil in one of the members for creating magnetic attraction between the members;

a switch mounted to the inner peripheral wall of the housing and connected to an electrical power source, the switch having a curved contact surface congruently fitable against an outer diametrical surface of the one member, the contact surface having a first position where it defines a radial gap with the one member;

an auxiliary magnetic coil on the switch adjacent the contact surface, the auxiliary coil energizable to move the contact surface from the first position into a second position where the contact surface is maintained in bearing, electrically conductive engagement with an outer diametrical surface of the one member;

a first portion of the switch connected between a current receiving end of the auxiliary coil and the electrical power source, the first portion being electrically insulated from the housing;

a second portion of the switch in series with a current transmitting end of the auxiliary coil, the second portion being grounded to the housing and the housing being grounded to the vehicle frame.

3. A differential having a lock-out mechanism, comprising:

a housing in which an input shaft and output shafts are journalled;

a gear case in the housing;

a transfer gear for rotating the case, the transfer gear rotating in response to rotation of the input shaft;

a pair of opposed gears, each of the opposed gears driving a respective output shaft;

an intermediate gear rotatably mounted to the gear case, the intermediate gear having one gear portion meshed with both of the opposed gears and having another gear portion rotating in concert with the one gear portion.

an annular gear member concentrically and rotatably mounted to the gear case, the annular gear being driven by the intermediate gear, whereby relative rotation between the opposed gears results in rotation of the annular gear member relative to the gear case;

a clutch plate member rotationally fixed relative to the case and axially translatable along the case;

wherein the clutch mechanism comprises a retention member disposed at an outer peripheral zone of the clutch plate member and connected to the housing, the retention member and the clutch plate member each having radial extensions, the radial extensions being interdigitated so that the retention member and the clutch plate member are axially constrained by one another;

a boss projecting from the retention member;

the housing defining a boss-receiving cam slot oblique to an axially facing plane intersected with the housing, whereby angular movement of the retention member in the housing translates the retention member and the clutch plate member along the case;

means for biasing the retention member to a first angular position such that the clutch plate member is disengaged from the annular gear member;

actuator means for moving the bracket to a second angular position such that the clutch plate member engages the annular gear member.

4. A differential having a lock-out mechanism, comprising:

a housing in which an input shaft and output shafts are journalled;

a gear case in the housing;

a transfer gear for rotating the case, the transfer gear rotating in response to rotation of the input shaft;

a pair of opposed gears, each of the opposed gears driving a respective output shaft;

an intermediate gear rotatably mounted to the gear case the intermediate gear having one gear portion meshed with both of the opposed gears and having another gear portion rotating in concert with the one gear portion.

an annular gear member concentrically and rotatably mounted to the gear case, the annular gear being driven by the intermediate gear, whereby relative rotation between the opposed gears results in rotation of the annular gear member relative to the gear case;

a clutch plate member rotationally fixed relative to the case and axially translatable along the case;

a main electromagnetic coil in one of the members for creating magnetic attraction between the members;

a switch mounted to the housing and having a curved contact surface congruently fitable against an outer diametrical surface of the one member, the contact surface having a first portion where it defines a radial gap with the one member;

an auxiliary magnetic coil on the switch, the auxiliary coil energizable to move the contact surface from the first position into a second position where the contact surface is maintained in bearing, electrically conductive engagement with the outer diametrical surface of the one member.

5. The device of claim 4, wherein the switch has two electrically conductive spring arms, one of the spring arms connecting an electrical power source and a current receiving terminus of the auxiliary coil, the other of the spring arms connecting a current transmitting terminus of the auxiliary coil to ground through the housing.

6. The device of claim 5 wherein the main electromagnetic coil is grounded through an electrical path including a portion of the annular gear member, the output shafts and the clutch plate member.

* * * * *